United States Patent [19]

Balderas et al.

[11] Patent Number: 4,736,845
[45] Date of Patent: Apr. 12, 1988

[54] "BRAKE/HOLD DOWN" PLUG FOR COMPUTER TAPE REEL CLOSURE

[75] Inventors: Michael Balderas; Ross P. Clark; Elsworth L. Urquhart, all of San Jose, Calif.

[73] Assignee: Memorex Corporation, Santa Clara, Calif.

[21] Appl. No.: 799,221

[22] Filed: Nov. 18, 1985

[51] Int. Cl.⁴ .............................................. B65D 85/67
[52] U.S. Cl. ....................................... 206/400; 206/523
[58] Field of Search ................... 206/398, 53, 55, 400, 206/523, 524, 593, 586, 587

[56] References Cited

U.S. PATENT DOCUMENTS

| | | | |
|---|---|---|---|
| 2,822,919 | 2/1958 | Kulka | 206/400 |
| 2,985,290 | 5/1961 | Locklin | 24/336 |
| 3,012,662 | 12/1961 | Kulka | 206/53 |
| 3,107,010 | 10/1963 | Kulka | 206/53 |
| 3,194,396 | 7/1965 | Mock | 206/53 |
| 3,371,882 | 3/1968 | Orlando et al. | 206/400 |
| 3,620,478 | 11/1971 | Fitzgerald et al. | 206/400 |
| 3,696,935 | 10/1972 | Dean | 206/400 |
| 3,939,977 | 2/1976 | Price et al. | 206/400 |
| 4,388,991 | 6/1983 | Price | 206/400 |
| 4,635,789 | 1/1987 | Webb | 206/53 |

FOREIGN PATENT DOCUMENTS

| | | | |
|---|---|---|---|
| 30320 | 9/1955 | Fed. Rep. of Germany | 206/53 |
| 1075352 | 7/1967 | United Kingdom | 206/53 |

Primary Examiner—Stephen Marcus
Attorney, Agent, or Firm—Townsend and Townsend

[57] ABSTRACT

Described are devices for securing a computer tape reel to an associated surrounding "wrap" where a T-sponge is inserted as an "inertial brake/hold down" between reel and wrap.

8 Claims, 7 Drawing Sheets

"BRAKE/HOLD DOWN" PLUG FOR COMPUTER TAPE REEL CLOSURE

This invention relates to devices for securing computer tape reels to associated closure-girdling means, and particularly to "inertial brake/hold down" devices therefor.

By way of background, and description of salient features, note the following:

Reels of high speed computer tape and the like are presently wrapped and shipped from a manufacturer with a belt or like girdling device secured about the reel periphery as a protective closure therefor. The free end of the tape wrapped upon the reel is usually secured with a semi-adhesive vinyl strip or like "hold-down". For instance in FIG. 1, a computer tape reel CTR is depicted as wrapped in an "auto-load" type (e.g., "Easy-Load") of girdling means, or wrap 1, whose ends are secured thereon with a latching mechanism 11, as known in the art. FIGS. 1, 3, 5 and 6 show such a wrap in more detail and are discussed below. [The "wrap" is also known as a belt, a seal, a band or the like. Some "wraps" are used only during first-transport to the user; others are used thereafter in-transit, etc.; and some, like the "auto-load" type are even mounted, with reel attached, on the tape drive, to be automatically removed thereby].

As workers know, one problem with such arrangements is the inter-abrading of reel flanges and the wrap means, and the consequent generation of "white powder" or like debris. Such "white powder" is particularly apt to develop when the wrap is made of a relatively abrade-able, shedding polymeric material such as polystyrene or ABS, and where the reel is made of similar material. [Polystyrene wrap on polystyrene reel flanges seems to generate a lot of "white powder" for example, with both parts being abraded]. And it is particularly apt to develop during extended transport vibration, e.g., in transit on a truck, aircraft or the like—where the reel flanges are rotated within the belt and/or are shaken radially back and forth.

Such problems are further exacerbated when a "shrink wrap" packaging is used which can compress the wrap into a relatively rigid "hoop" within which the tape reel is especially free to rotate or shake. One object hereof is to minimize this problem and minimize, if not eliminate, the consequent abrasion-debris.

Such "abrasion-debris" is less of a problem when the wrap is comprised of "softer" materials, less apt to so shed (e.g., "Tape Seal" belts of polyethylene)—or equivalent wraps which don't seem to develop much debris.

Figure 2:
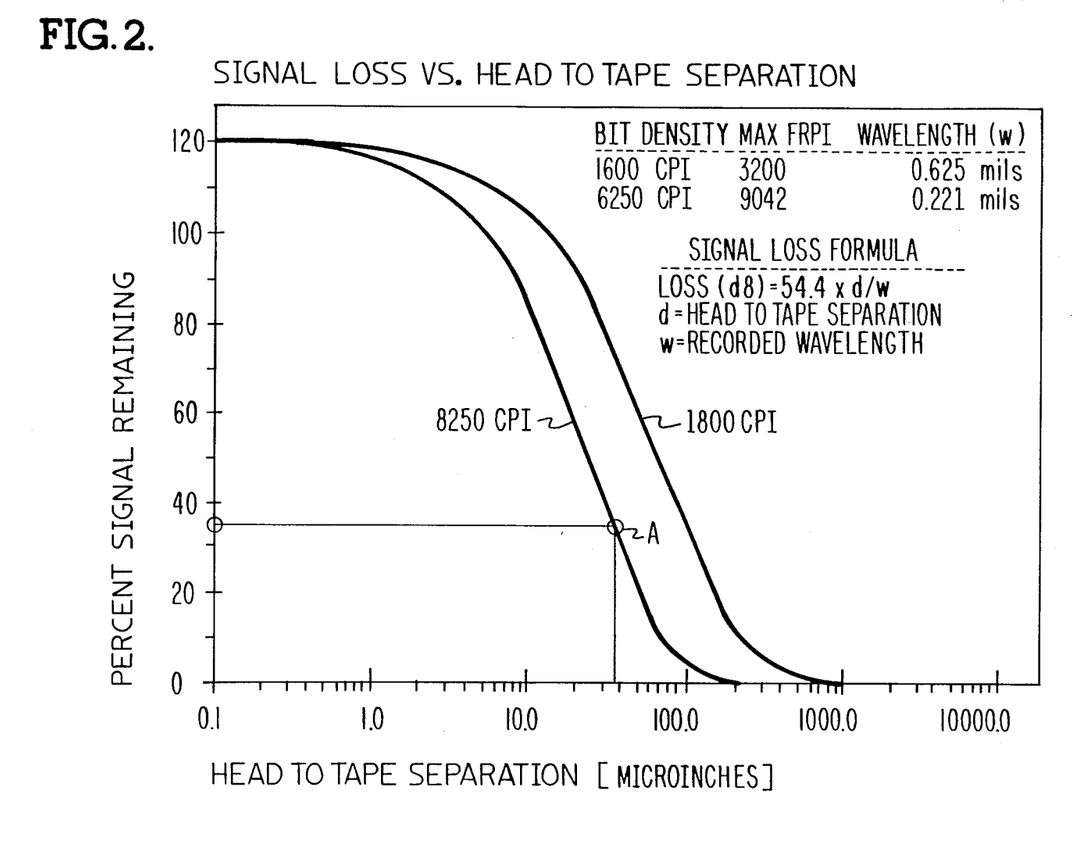
FIG. 2 is a plot of typical signal loss vs. Head-Tape separation.

As workers well know, such debris can readily clog a tape drive (e.g., read/write head) in operation; worse yet, it can cause a head to lift away from the tape during read/write operations causing "drop-outs" or the like—bearing in mind that head-tape separation is apt to be as little as one micron (1 $\mu$ or 40 $\mu$") and these debris particles can easily exceed that dimension. For instance, note the curve in FIG. 2 where "% Signal Loss" is plotted vs. "Head-Tape Separation" for a typical recording: about 35% loss is experienced (with 6250 cpi bit density) where separation is about 38 $\mu$" (about 4 mils or 1 micron)—and "abrading-wrap" debris diameter regularly exceeds this dimension.

With these and related problems in mind, it is one object of the subject invention to substantially reduce, if not eliminate, "white powder" and like debris by more firmly securing such girdling devices to computer tape reels—while preferably also securing the tape wrapped upon its hub ("hold-down" function).

A related object is to secure tape reels within an encompassing wrap such that relative movement is minimized, if not eliminated—and especially so that consequent abrading action and resultant "debris" are minimized. A more particular object is to do this by introducing one or more resilient "inertial braking" members between the reel flanges and the girdling means, especially where such a braking member comprises a resilient, low density, compressible inexpensive material which is highly resistant to "shedding". Yet a further object is to provide such a braking member in the form of a compressible "T-shaped sponge".

A more particular object is to provide such a "sponge" so constructed and so disposed between a belt and reel flanges, as to be compressed between these as an "inertial brake" means intercoupling the flanges to the belt so neither moves relative to the other—and also, preferably, wherein this "sponge" is compressed to resiliently fill the space defined by the belt, the flanges and the wrapped tape. An additional object is to provide the foregoing, with the "sponge" also acting as a "hold-down" means securing the tape (end) in place upon the reel hub (and eliminating the need for other means to do this).

In a particular embodiment, a sponge of polyester foam is fashioned and inserted as "inertial braking" means to inhibit reel movement (rotation) within the auto-load wrap, eliminating, or at least decreasing, debris generated by abrasion of these two and consequent generation of "white powder"—while also preferably acting as a "tape hold-down" for the computer tape wound upon the reel. This is particularly important where such a reel and wrap are made of abradeable material like polystyrene.

This feature is particularly apt when provided as a resilient pad laid across the reel flanges, or otherwise engaged-compressed between the flanges and the surrounding wrap.

Such a pad preferably acts as a radial-damper; and it is preferably comprised of material which is resilient, low-density (preferably a foamed polymer), readily compressible, inexpensive and "shed-resistant". Such material will be fashioned to be thick enough, and compressible enough, to so couple a tape reel (periphery) to its encircling wrap as to inhibit, if not eliminate, relative rotational and radial movement.

Such a pad should also be formed to be somewhat "self-retaining" on the reel flanges or on the associated wrap. For instance, one might imagine that a mere flat sponge pad could be laid across the reel flanges and compressed by the wrap secured thereon with comparable effect—not so however, since during assembly, and re-assembly, such a flat pad would be difficult, if not impossible, to hold in place while the wrap was being superposed and secured. Thus, it is also an object to provide such a "T-sponge" which is formed to be "self-retaining" on the reel or on the wrap.

These and other features and advantages of the present invention will be appreciated by workers as they become better understood by reference to the following detailed description of the present preferred embodiments which should be considered in conjunction with the accompanying drawings, wherein like reference symbols denote like elements.

BRIEF DESCRIPTION OF THE DRAWINGS

FIG. 3-B showing a modified sponge semi-compressed by the same wrap); with FIG. 4 showing a portion of these without intervening sponge.

DESCRIPTION OF A FIRST PREFERRED EMBODIMENT

Figure 1:
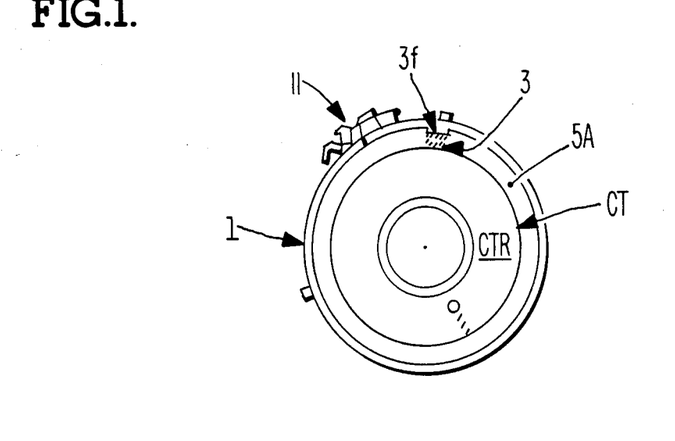
FIG. 1 schematically illustrates a "belted" tape reel (cartridge assembly) with intermediate "inertial brake" T-sponge according to one embodiment.
Figure 6:
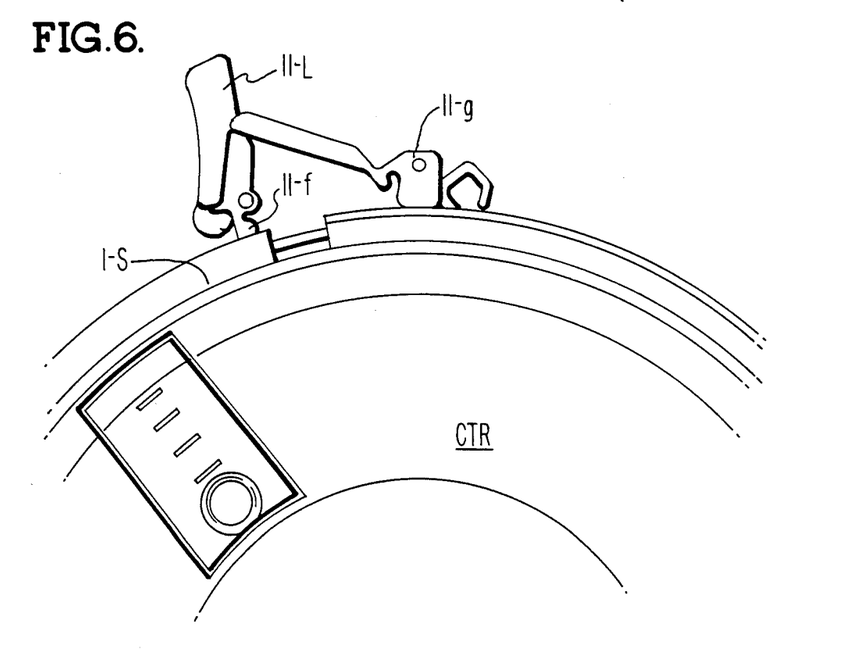

FIGS. 1, 6

General description, background

FIG. 1 schematically illustrates a "belted" tape reel (cartridge assembly) with intermediate "inertial brake" T-sponge 3 constructed and arranged according to principles of this invention. This, and other related means discussed herein, will generally be understood as constructed and operating as presently known in the art, except where otherwise specified. And, except as otherwise specified, all materials, methods and devices and apparatus herein will be understood as implemented by known expedients according to present good practice.

As suggested before, FIG. 1 shows, in simplified elevation, a conventional computer tape reel CTR with flange members 5-A, 5-B understood as engaged with an encircling auto-load type wrap (e.g., Easy-Load) including latching means 11, as known in the art. The outer end of the computer tape CT will be understood as wrapped upon the reel hub and, preferably, secured there to itself (e.g., with the well known self-adherent strip of vinyl, etc. as the "hold-down").

According to this embodiment, a resilient "T-sponge" 3 is provided as "inertial brake/hold down means" between belt 1 and the periphery of reel flanges 5-A, 5-B, with sponge 3 being compressed and thrust radially-inward, engagingly upon flanges 5-A, 5-B by the attachment and latching of wrap 1 (by latching means 11 as known in the art). T-sponge 3 should not be disposed under latch 11 or at any other place on the wrap where it is a problem (e.g., not at air-aperture either); otherwise anywhere under wrap 1 (on the periphery of flanges 5-A, 5-B) is satisfactory.

Figure 3:
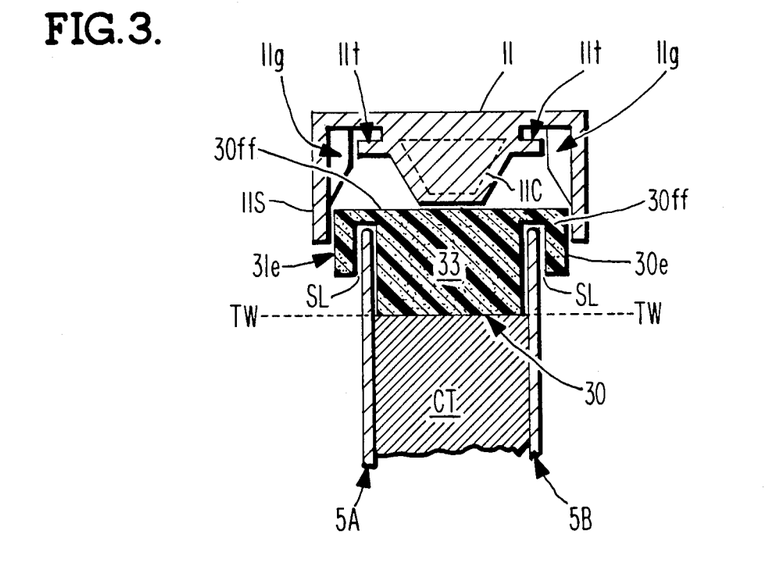
FIG. 3 is an enlarged section of a T-sponge embodiment compressed between a tape reel and an "auto-load" type wrap (FIG. 3-A showing the sponge uncompressed, resting on the reel.
Figures 3A, 3B:
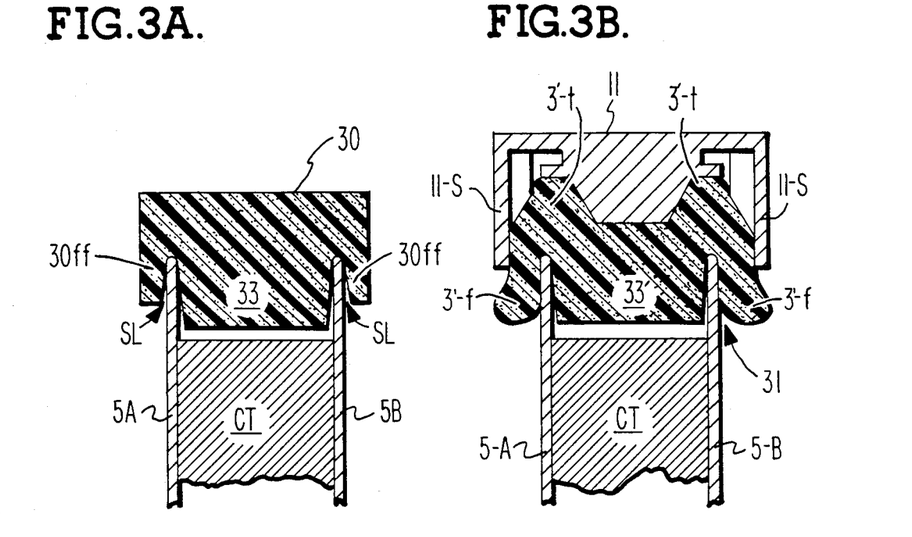

The enlarged sectional, simplified detail in FIG. 3 illustrates a like resilient T-sponge 30 as comprising a "stem" portion 33 flanked by opposing "edge" (or "ear") portions 30-$ff$ of reduced thickness. Edge portions 30-$ff$ (shown compressed) are adapted and disposed to overlap and frictionally engage (the outer periphery of) reel flanges 5-A, 5-B and also to frictionally engage the encircling wrap 11 (stem 33 squeezed against reel flanges and tape CT). As indicated in FIG. 3A, "T-sponge" 30 will be understood as made "self-retaining" to the reel (flanges 5) by making stem 33 wide enough to give an oversized interference-(friction) engagement between flanges 5-A, 5-B; as well as by slitting the edge portions up part-way along both sides of stem 33, as depicted (and see SL in FIG. 7), to introduce a "gripping crack", or slit SL, with an ear portion 30-$ff$ thus left outboard of each slit. Workers will appreciate that this, or a like construction, will render the T-sponge somewhat "self-securing" to flanges 5-A, 5-B—e.g., to facilitate manual insertion upon (and retention on) the flanges during assembly (before the wrap is attached)—such being schematically depicted in FIG. 3-A (notice edges 30-$ff$ and stem 33 not compressed here, vs. FIG. 3A).

Figure 5:
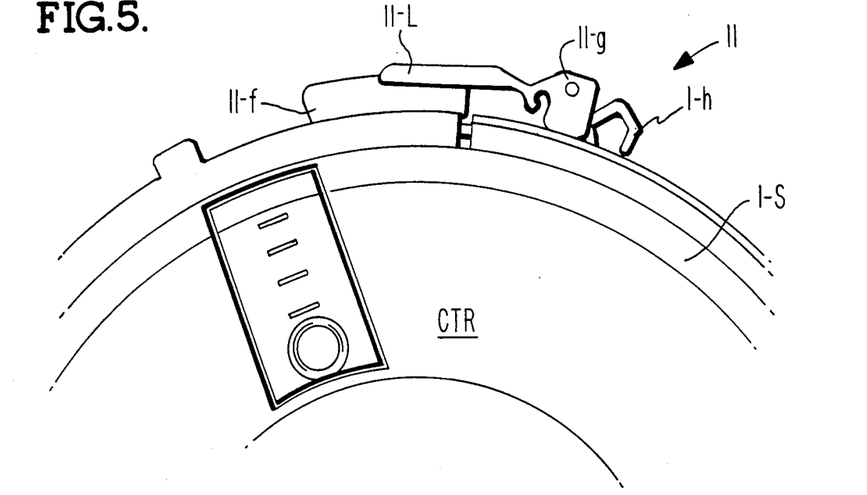
FIGS. 5, 6 giving an enlarged, partial side elevation of the latch portion of such a wrap (shown with the latch "locked" and "half-unlocked", respectively); with FIG. 7 showing the "T-sponge" alone, and uncompressed, in greatly enlarged sectional view.

The wrap 11 depicted in FIGS. 1 and 3 may be understood as an "auto-load" type (such as the "Easy-Load" made by PPD Co., Irvine, Calif.), an example of which is shown, in partial enlarged elevation in FIGS. 5 and 6 (secured in "locked" condition on reel CTR in FIG. 5; and in "unlocked", "partly-opened" condition in FIG. 6).

The "Easy-Load" wrap 11 is schematically depicted in FIG. 3 as secured on a typical computer tape reel CTR (flanges 5-A, 5-B thereof), with "T-sponge" 30, which represents the preferred embodiment, according to the invention, compressed therebetween (sponge "edges" 30-$ff$ thrust brakingly upon flanges, and vs. sides thereof, by wrap 11, with stem 33 of the sponge also thrust vs. flange-sides and vs. tape CT, wrapped upon the reel hub (to retain it there as a "hold-down"). Workers will recognize that "Easy-Load" wrap 11 includes the familiar features of side members 11-S, flanking the T-sponge 30 and medial chamber 11-C, adapted to thrust stem 33 radially inward, and depending on the level of tape CT, outward vs. reel flanges too. Chamber 11-C will be recognized as hollow; being adapted to introduce pressurized air to the associated "auto-unload" mechanism of the tape drive.

It will be apparent that the extended engagement-surface area between sponge 30 and flanges 5A, 5B, as well as chamber 11-C (and, possibly, vs. edges 11-S and other inner surfaces of wrap 11) is intended and adapted to enhance the "inertial brake" function inhibiting relative rotation (of wrap about reel). Similarly, the engagement of sponge 30 vs. the flange edges (and vs. tape CT when suitably disposed) serves to suppress relative radial movement, and vibration of the reel within the wrap.

Figure 4:
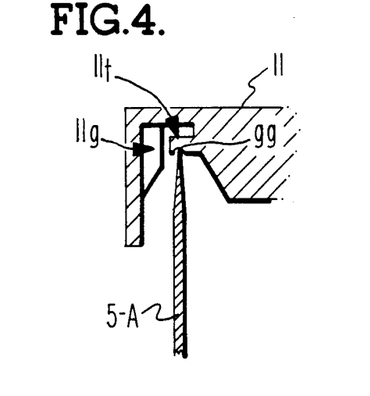

One salutary effect of using such a T-sponge is, of course, to reduce, or eliminate, reel-wrap abrasion and resultant debris (cf. "white powder"). When an "Easy-Load" wrap of the illustrated type is used, such abrasion can be very severe. A principal cause is the relative high-pressure engagement of the flange edges vs. the usual "tabs" 11-$t$ extending flanking each side of central air-chamber 11-C (see FIGS. 3, 4). Workers will recognize that there are only a few such tabs along each of the two circumferential channels (e.g., three pairs, or six total tabs is common) and that these occupy a relatively minor portion of the entire channel circumference (e.g., about ¼" each, or total of about 6×¼", or 1.5", along a channel circumference of about 32"). Thus, when the flanges are thrust into contact with tabs 11-t (as often happens when the Easy-Load is secured in place—intermittent contact under vibration-rotation being unavoidable, usually), the knife-like, sharp-edged flange edges exert relatively high-pressure contact against the tabs and are very likely to abrade them. Typically, the flanges are 1/16–2/16" thick and about 9/16–10/16" apart (for ½" tape). For instance, under typical vibration testing (see below) the flanges are soon observed to wear a groove into the tabs, like groove gg in FIG. 4, especially where both the flanges and the "Easy Load" are made of polystyrene (ABS is also problematic, a polyethylene wrap being much less abradeable). Thus, a "T-sponge" can help a great deal here.

Of course, the sponge is preferably "self-securing" to the reel here so that during assembly it can be readily popped onto the reel and will stay there (until wrap secured onto the reel—alternatively, one may make the sponge "self-securing" to the wrap—as below). Making the stem slightly "too wide" so it may be slightly compressed when lodged between flanges and held there frictionally is one way. Another is to seat the flanges in the sponge slits at least slightly. Both features are exhibited in the preferred T-sponge 30.

And, with the sponge so-slit and engaged on the flange edges, when the wrap is locked-on, it can compress stem 33, both radially-inward against tape CT, as well as laterally (circumferentially—assuming stem 33 "bottoms" vs. tape CT) against the opposed inner faces of flanges 5-A, 5-B, thus adding further engagement-area and frictional force to better secure the reel to the wrap.

Figure 7:
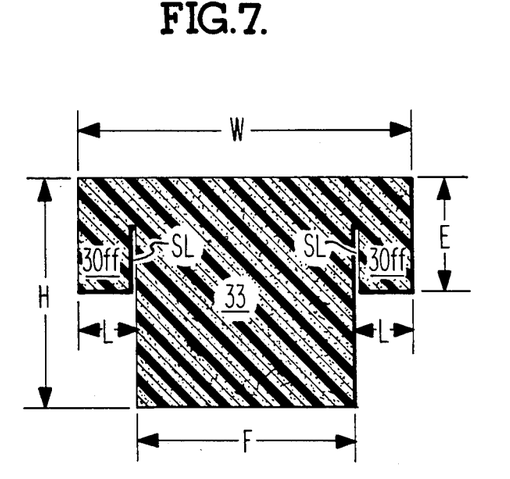

Plug 30 is shown in enlarged sectional view in FIG. 7. It is specially adapted for use with an "Easy-Load" type auto-load wrap (e.g., about ⅝" wide) adapted for a tape reel of comparable width and outer diameter as is well known in the art (and variable level TW of tape wrap, see FIG. 3—Note: even aside from "hold-down" functionality, it is evidently preferable to have stem 33 slightly over-fill the inter-flange space, when wrap-compressed, and thereby frictionally engage the flanges to give enhanced "inertial braking" and damping vs. radial vibration. In extreme cases, the "ears" alone may serve these functions, but this is less preferable). Typically, the flanges are made of polystyrene, with the Easy-Load of polystyrene also.

For such a reel-wrap (cartridge) array, the following sponge dimensions are useful for performing the cited inertial braking and hold-down function:

In FIG. 7, sponge 30 preferably has the following dimensions: a width W of about 1⅛" (—vs. ⅝" Easy-Load?) by a length, not shown, of about 1" and a height H of about 1", with edge-height E about ¼", the edges being extended from the body 31 and ¼" (L) and the stem width F being about ⅝" (assume ½" computer tape).

Material

The material will be generally as above-characterized, and, in a preferred embodiment, comprises an open-cell low-density foam, a type polyester sponge, "PE-250" (by Great Western Foam, Hayward, Calif.) having a density of about 2.0 lb/ft$^3$; no more than about 3), having a compressibility of about 70% (minimum recovery, per MIL-R6130A) and elongation of the order of 170% or more. All ingredients used, including plasticizers, should survive about 110° F. or more (minimum melting point). Sponge 30 is preferably die-cut to the mentioned dimensions. One further advantage of highly-compressible foam (low density, etc.) is that it better accommodates "E-value" variations (i.e., varying size of space between flanges not occupied by tape—this variation due to varying lengths of tape wrapped on the reel).

Though polyester is preferred for such uses (e.g., being shed-resistant during vibration), other materials such as polyurethane and polyethylene will serve in some cases—and preferably as a foam (open-cell or closed-cell). Foam material is preferred because it results in minimal processing debris, such as die-cut flash.

Results

T-sponge 30 above-described seems to give all the desired results and characteristics. For instance, when secured between an Easy-Load wrap and a loaded reel as above-described, it survives standard vibration testing without generating any appreciable "white powder" or other debris (cf. ASTM Test #996, for packaging vibration). And the reel undergoes no appreciable radial-looseness or circumferential rotation. This is surprising in light of the relatively tiny mass of sponge 30 and its relatively small engagement area (on reel and/or on wrap).

Alternatively, sponge 30 may comprise a comparable low-density, open cell polyurethane foam such as #P-34 foam by Great Western Foam Co. with a density of about 2–3 and otherwise the same as the prior embodiment. This material may be useful for certain cases, but is apt to be less preferable in that it tends to unduly shed and is more apt to generate a little debris. Otherwise, results are the same as with the polyester sponge above-described.

Interestingly, when such a urethane sponge is fashioned with a density of about 4 or more, it tends to unduly bow flanges 5-A, 5-B away from one another, when compressed in the indicated manner by wrap 1. Thus, a maximum density for the sponge plug 30 should be less than about 4 lb/ft$^3$ (about 2 lb/ft$^3$, or less, is preferred).

Another alternative sponge material will have the indicated characteristics and may comprise an analogous low-density, non-abrading polyethylene foam.

Alternative wrap means will be contemplated by artisans, e.g., "Super Seal" by P.P.D. Co., "EDP Wrap" by E.D.P. Co., "Autoload" by Memorex Corp. and "Tape Seal" or "Wright Line" by Wright Co.— with appropriate adjustment in sponge structure and dimensions. In any event the "T-sponge" will preferably comprise a central stem portion spanning the inter-flange space plus a pair of flanking edge portions, each adapted to cover a respective flange-edge.

FIG. 3-B illustrates a modification of sponge 30 (FIG. 3) to accommodate enhanced engagement with the wrap (otherwise the same as above)—wherein the sponge 3' includes protuberances 3'-T adapted to intrude into the two grooves of wrap 11 (identical with wrap in FIG. 3) whereby to increase the total sponge-wrap engagement surface (more powerful "inertial brake" function, etc.) and also enhance the "self-retaining" feature whereby the sponge can also cling to the wrap during assembly, etc. Otherwise, sponge 3' is essentially the same as sponge 30 above-described; however, note that sponge 30 in FIGS. 3, 3-A is "self-retaining" only to the reel.

Figure 8:
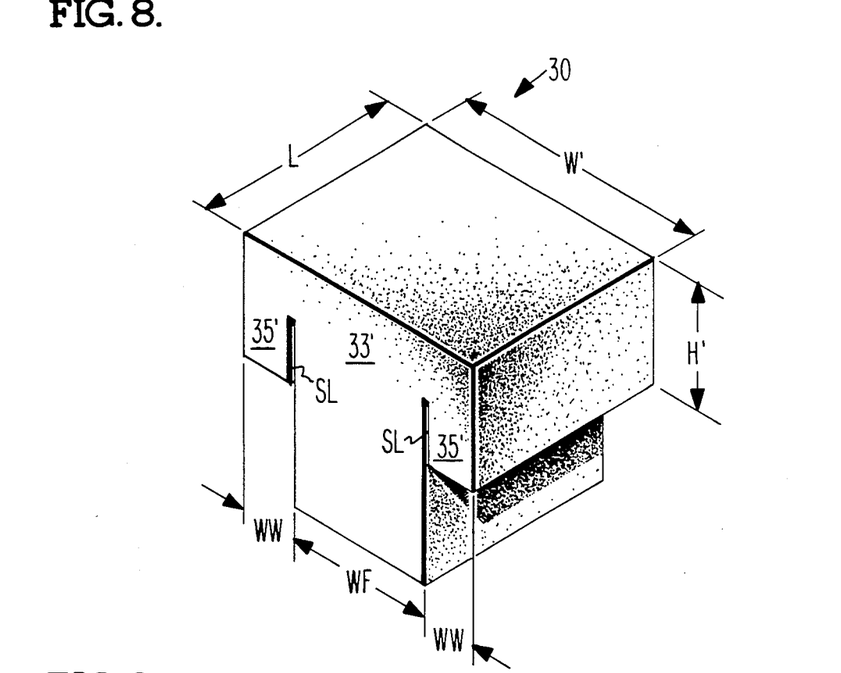
FIG. 8 shows in perspective schematic a like T-sponge embodiment, with this embodiment shown resting on a reel in section in FIG. 9.
Figure 9:
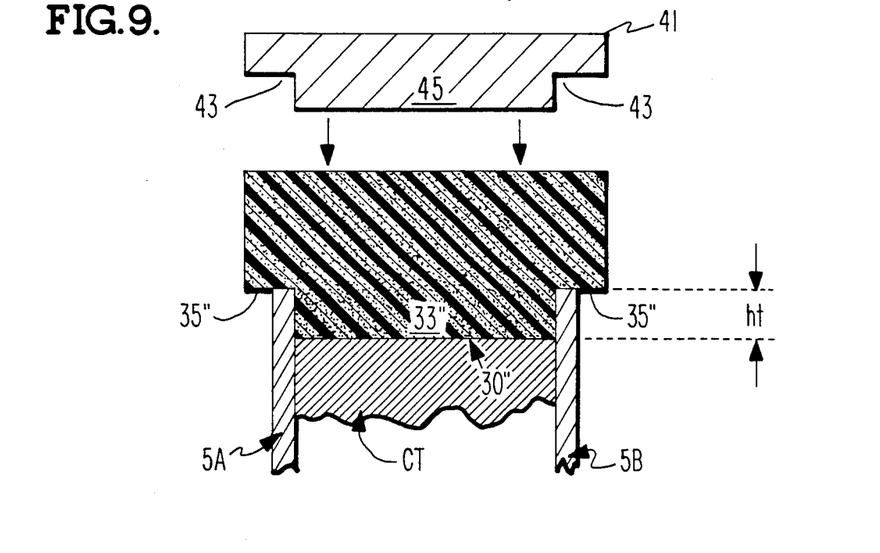

Second Embodiment; FIGS. 8, 9

FIGS. 8, 9 indicate an alternative "T-sponge" 30', understood as generally the same as plug 30 above (similarly manufactured and used) except as otherwise described. Sponge 30' will be observed as including side members 35' with flange-receiving slits sl, sl cut thereinto. Thus, the periphery of flanges 5-A, 5-B will be understood as to be inserted into the slits 35, 35'.

Stem 33' of sponge 30' will have a width WF adapted to slightly over-span the distance between flanges of the contemplated reel (e.g., ¾" here) and side members 35', 35 are projected beyond stem 33' sufficient (e.g., here about ⅛" each, see ww) to cover the flange edges. The height H' of sponge 30' may be set to bear against a contemplated wrapped-tape position in the reel (e.g., see TW—TW in FIG. 3), or to fall short of the outermost wrapped location TW—TW, i.e., not bottom against any tape CT. Sponge 30' may be die-cut to any suitable length L' and width W' (e.g., ⅞"×1"), long enough to give adequate engagement area for the contemplated use—as workers will appreciate (likewise for height hh' of side members 35 are associated slits SL).

Results

Are similar to those in the above embodiment, with little or no white powder, or other harmful debris, observed under like test conditions.

And workers will understand that other equivalent forms of a sponge may be designed and used in similar fashion. For instance, sponge 30'' of FIG. 9 may be fashioned to be engaged between the reel and a "T-shaped" wrap, e.g., like wrap 41 in FIG. 9, having mere edge-notches 43 on either side to engage flanges 5-A, 5-B, with center-stem 45 to be seated above the inter-flange space. Associated T-sponge 30'' will include a stem portion 33'' wide enough to frictionally engage both flanges 5-A, 5-B (e.g., as-compressed), and thick enough (ht) to provide the required compressive inter-engagement (though one may dispense with the desired "hold-down" function). Sponge side members 35' are extended beyond stem 33' sufficient to project beyond the flanges and are high enough to keep the wrap notches 43 from "bottoming" on the reel flanges when secured thereon (i.e., leaving some of compressed sponge thickness therebetween).

Figure 10:
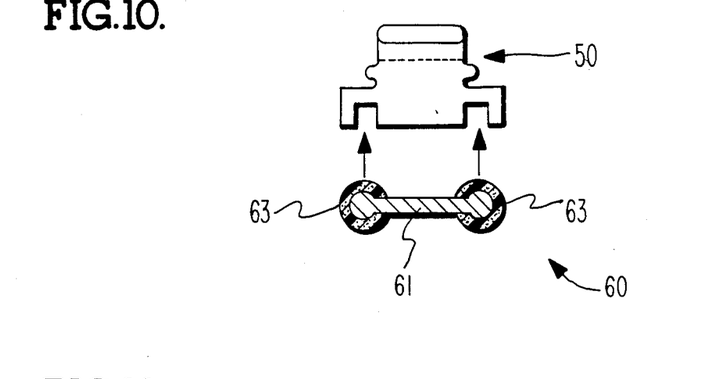
FIG. 10 shows a modified wrap and associated modified sponge, exploded away.

Another type of wrap (e.g., Tape Seal by Wright Co.) exhibits a pair of side-channels each adapted to receive a respective reel flange. Such is depicted schematically in section at 50 in FIG. 10. For such a wrap, one may modify the sponge to comprise a pair of compressible tubular side-members joined by a common strap, each side member being adapted for friction-engagement in a respective wrap channel to be self-secured (e.g., "snap-in" fit) there during assembly. Thus, note "Catamaran-sponge" 60 in FIG. 10 with a pair of compressible tube members 63 (e.g., hollow, or compressible foam) joined by a common strap 61.

Figure 11:
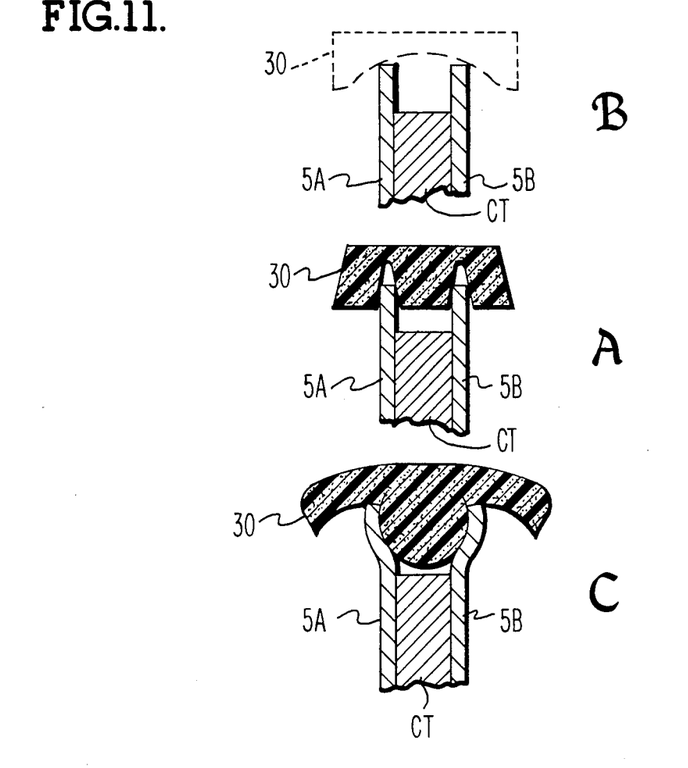
FIGS. 11A–11C show, very schematically, three variations in sponge shape for self-retention on the reel.

As FIG. 11-A suggests, a "sponge" may be "self-securing" and grip the associated reel flanges by gripping each in a slit formed between "stem" and "ears" (also see FIG. 3 above); alternatively, the sponge may grip primarily via an enlarged stem lodged between the flanges (however it should not "bow" them outward—as in FIG. 11-C); or the sponge may, in certain instances (not preferred), dispense with the "stem" and capture the outside of the flanges in a center cavity shaped to do so (cf. FIG. 11-B).

Figure 12:
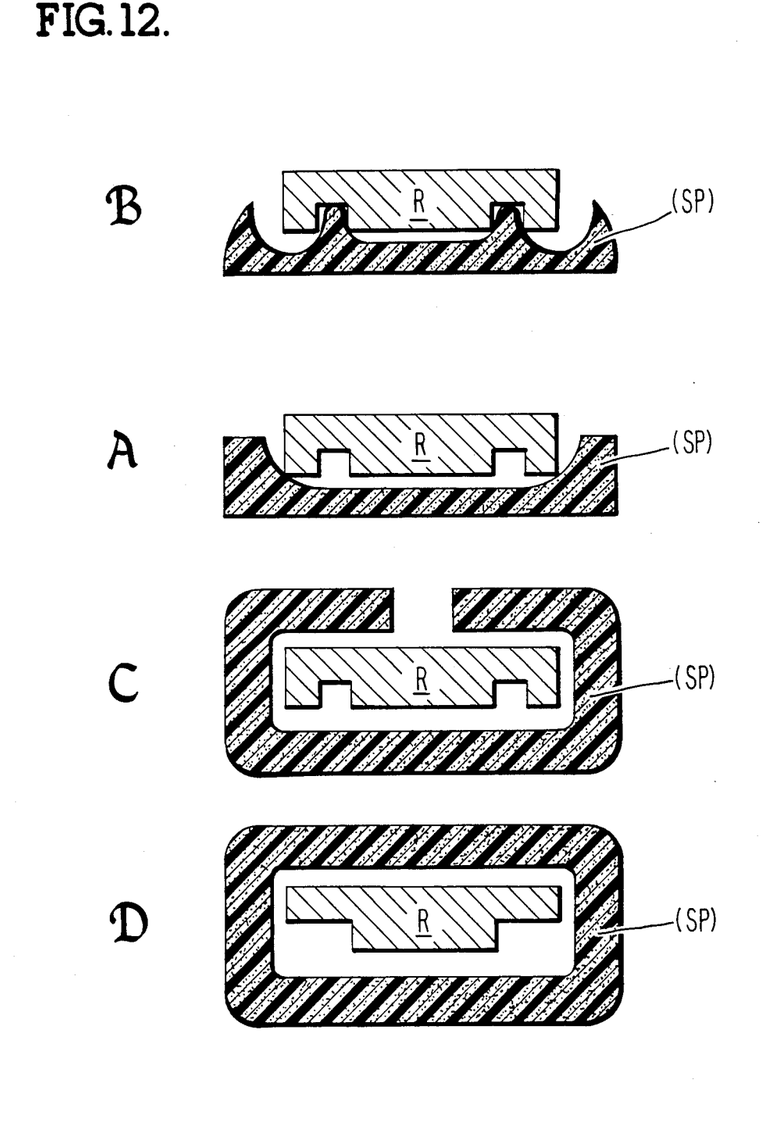
FIGS. 12A–12D show, very schematically, wrap structures with associated sponge structure adapted for self-retention thereon.

One may fashion the sponge to grip the wrap—e.g., by forming it with an "upper" cavity designed to grip the wrap outer-edges (cf. FIG. 12-A sponge SP, wrap R), apart from whether slits or a center "stem" is used or not. Further, for "grooved-wraps", one may include "detent-protuberances" as in FIG. 12-B adapted to frictionally engage the wrap-grooves and cling to them.

In another modification the sponge may be formed to encircle all, or part, of the wrap and so cling to it as in FIGS. 12-D, 12-C respectively (note wrap R in FIG. 12-D is "T-shaped", not "grooved"). The "encircling" sponges are "non-preferred" for most cases, principally because they are more expensive and may be somewhat time-consuming and problematic to attach to the wrap. Of course, in any event, one may use "wrap-retention-means" and/or "reel-retention-means" alone or together.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to analogous web reels and associated girdling means. Also, the present invention is also applicable for providing such inter-engagement with modified wraps, such as those used with reels of audio tape, video tape, etc.

The above examples of possible variations of the present invention are merely illustrative. Accordingly, the present invention is to be considered as including all possible modifications and variations coming within the scope of the invention as defined by the appended claims.

What is claimed is:

1. A low-debris tape cartridge assembly comprising a tape reel with a prescribed amount of tape wrapped thereon, an associated wrap means adapted to be wrapped encirclingly about the tape reel and secured thereon, and elastomeric, highly-compressible sponge means adapted to be resiliently interposed between the reel and the wrap means along a minor sector thereof, said sponge means including a center portion flanked by a pair of edge portions adapted to be interposed between belt means and reel along a very minor sector thereof, such that with the center portion disposed between tape reel flanges each edge portion covers a respective flange whereby, with the belt means secured upon the tape reel, all reel portions are isolated resiliently from the belt means without the intervening sponge being fully-compressed anywhere, so that relative vibration and rotation between belt means and reel generates little or no harmful "debris".

2. A storage device comprising a tape reel means including a pair of disk-like flanges; magnetic recording tape wrapped on said reel means; reel girdling means enwrapped protectingly about the periphery of said reel flanges, and a compressible T-shaped engagement pad means for resiliently coupling a minor sector of the outer edges of the flanges of the tape reel to said related girdling means; said pad means being adapted to be less-than-fully compressed between the reel means and the girdling means, sufficient to inhibit relative rotary and radial movement of the reel means and to prevent inter-abrasion of reel means and girdling means, said pad means further being fashioned of highly-compressible, shed-resistant, elastomeric material and including a central stem portion dimensioned to slightly overfill the space between the tape and said girdling means, the pad means also exhibiting opposed edge portions, each dimensioned and disposed to "cover" a respective flange periphery;

wherein the girdling means comprises a polymer abradeable by relative motion against said flange members; and wherein the pad means is "self-retaining" on the reel means or on the girdling means, or on either.

3. The combination as recited in claim 2 wherein the wrapped tape is comprised of polystyrene or ABS.

4. The combination as recited in claim 3 wherein the flanges are comprised of polystyrene.

5. The combination as recited in claim 2 wherein the pad means is comprised of low-density, shed-resistant polymeric foam.

6. The combination as recited in claim 5 wherein the foam is characterized by a density of 3-4 or less and comprises polyester, polyurethane or polyethylene.

7. The combination as recited in claim 6 wherein the polyester is characterized by elongation of about 130% or more, with minimum compression recovery of about 30%.

8. The combination as recited in claim 2 wherein the edge-portions of said pad means are also characterized by slits severing a part of each edge portion from the stem portion and adapted to receive a flange.

* * * * *